United States Patent
Guen

(10) Patent No.: US 10,763,489 B2
(45) Date of Patent: Sep. 1, 2020

(54) RECHARGEABLE BATTERY HAVING MEMBRANE

(71) Applicant: SAMSUNG SDI CO., LTD., Yongin-si, Gyeonggi-do (KR)

(72) Inventor: Minhyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 103 days.

(21) Appl. No.: 16/096,273

(22) PCT Filed: Nov. 10, 2016

(86) PCT No.: PCT/KR2016/012949
§ 371 (c)(1),
(2) Date: Oct. 24, 2018

(87) PCT Pub. No.: WO2017/188533
PCT Pub. Date: Nov. 2, 2017

(65) Prior Publication Data
US 2019/0140252 A1    May 9, 2019

(30) Foreign Application Priority Data

Apr. 26, 2016 (KR) .................. 10-2016-0050997

(51) Int. Cl.
*H01M 2/34* (2006.01)
*H01M 2/26* (2006.01)
(Continued)

(52) U.S. Cl.
CPC .......... *H01M 2/348* (2013.01); *H01M 2/206* (2013.01); *H01M 2/26* (2013.01); *H01M 2/30* (2013.01);
(Continued)

(58) Field of Classification Search
None
See application file for complete search history.

(56) References Cited

U.S. PATENT DOCUMENTS

| 2011/0135976 A1 | 6/2011 | Byun |
| 2012/0202096 A1 | 8/2012 | Kim |

(Continued)

FOREIGN PATENT DOCUMENTS

| JP | 2002-216743 A | 8/2002 |
| JP | 2011-124214 A | 6/2011 |

(Continued)

*Primary Examiner* — Wyatt P McConnell
(74) *Attorney, Agent, or Firm* — Lewis Roca Rothgerber Christie LLP

(57) ABSTRACT

A rechargeable battery according to an exemplary embodiment of the present invention includes: an electrode assembly that includes a first electrode and a second electrode; a case where the electrode assembly is received; a first terminal that is electrically connected with the first electrode and a second terminal that is electrically connected with the second electrode; a cap plate that is coupled with the case, and where a short-circuit hole is formed; and a membrane that is fixed to the cap plate and electrically separates or disconnects the first electrode and the second electrode, wherein the second terminal includes a fuse connector, a first portion, and a second portion, and the first portion and the second portion are connected by the fuse connector, and the fuse connector is disposed apart from the membrane and disposed opposing the membrane.

14 Claims, 10 Drawing Sheets

(51) Int. Cl.
*H01M 2/30* (2006.01)
*H01M 2/20* (2006.01)

(52) U.S. Cl.
CPC ............ *H01M 2/34* (2013.01); *H01M 2/345* (2013.01); *H01M 2200/103* (2013.01); *H01M 2200/20* (2013.01); *Y02E 60/122* (2013.01); *Y02T 10/7011* (2013.01)

(56) References Cited

U.S. PATENT DOCUMENTS

| | | |
|---|---|---|
| 2013/0029191 A1 | 1/2013 | Byun et al. |
| 2013/0196179 A1 | 8/2013 | Han et al. |
| 2014/0377601 A1* | 12/2014 | Kim .................. H01M 2/34 429/61 |
| 2015/0207131 A1 | 7/2015 | Han |

FOREIGN PATENT DOCUMENTS

| | | |
|---|---|---|
| KR | 10-1175020 B1 | 8/2012 |
| KR | 10-2013-0012627 A | 2/2013 |
| KR | 10-2013-0089134 A | 8/2013 |
| KR | 10-2014-0147351 A | 12/2014 |
| KR | 10-2015-0086841 A | 7/2015 |

\* cited by examiner

RECHARGEABLE BATTERY HAVING MEMBRANE

CROSS-REFERENCE TO RELATED APPLICATION(S)

This application is a U.S. National Phase Patent Application of International Application Number PCT/KR2016/012949, filed on Nov. 10, 2016, which claims priority of Korean Patent Application Number 10-2016-0050997, filed on Apr. 26, 2016, the entire contents of all of which are incorporated herein by reference.

Technical Field

The present invention relates to a rechargeable battery. More particularly, the present invention relates to a rechargeable battery having a membrane.

Background Art

Unlike a primary battery that is incapable of being recharged, a rechargeable battery is capable of being charged and discharged. Low-capacity rechargeable batteries are used for portable compact electronic apparatuses such as mobile phones, notebook computers, and camcorders, and high-capacity rechargeable batteries are widely used as a power source for driving a motor of a hybrid vehicle, etc.

Recently, a high power rechargeable battery that includes a non-aqueous electrolyte having high energy density has been developed, and is constituted by a large capacity rechargeable battery in which a plurality of rechargeable batteries are coupled in series in order to use it to drive devices requiring a large amount of power, for example, motors such as for electric vehicles.

In addition, a large capacity rechargeable battery generally includes a plurality of rechargeable batteries that are coupled in series, and the rechargeable battery may be formed with cylindrical and angular shapes.

When an abnormal reaction occurs in the rechargeable battery having a case that is made of a metal and the like and thus an internal pressure is increased, the case is opened and charging and discharging need to be blocked. In order to block charging and discharging, a short circuit needs to be caused to discharge a charged current.

DISCLOSURE

Technical Problem

According to an exemplary embodiment of the present invention, a rechargeable battery having improved safety can be provided.

Technical Solution

A rechargeable battery according to an exemplary embodiment of the present invention includes: an electrode assembly that includes a first electrode and a second electrode; a case where the electrode assembly is received; a first terminal that is electrically connected with the first electrode and a second terminal that is electrically connected with the second electrode; a cap plate that is coupled with the case, and where a short-circuit hole is formed; and a membrane that is fixed to the cap plate and electrically separates or disconnects the first electrode and the second electrode, wherein the second terminal includes a fuse connector, a first portion, and a second portion, and the first portion and the second portion are connected by the fuse connector, and the fuse connector is disposed apart from the membrane and disposed opposing the membrane.

The rechargeable battery may further include a connection terminal that is inserted into the first portion and connects the second electrode and the second terminal, wherein the second portion is connected with a bus bar that electrically connects neighboring rechargeable batteries, and a thickness of the fuse connector may be 0.05 times to 0.6 times a thickness of the first portion.

In addition, the fuse connector may have a width that is smaller than the first portion, and the fuse connector is disposed apart from the membrane and contacts the membrane when the membrane is deformed.

The membrane may contact the fuse connector and thus causes a short circuit when being deformed, the second terminal may further include a support member that surrounds the fuse connector and has an electrical insulation property, and the support member may be inserted between the first portion and the second portion.

The membrane may include two support portions that are formed flat and a deformable portion that is provided between the two support portions and being curved, and the deformable portion may be formed in the shape of a partial cylinder, and the support portions are extended in a straight line direction and are thus connected to opposite ends of the deformable portion.

The fuse connector may be protruded downward and inserted into the short-circuit hole, and the fuse connector may include a bottom side, a first side that protrudes upward from the bottom side and is connected with the first portion, and a second side that protrudes upward from the bottom side and is connected with the second portion.

The second terminal may further include a guide protrusion that protrudes toward the membrane and guides deformation of the membrane, and the rechargeable battery may further include an upper insulation member that is disposed between the second terminal and the cap plate, wherein the upper insulation member may further include a connection hole that is disposed between the membrane and the fuse connector, and the connection hole may have a quadrangular-shaped cross-section. The fuse connector may have a thickness that is smaller than that of the first portion and that of the second portion.

According to another aspect of the present invention provides a method for blocking a current of a rechargeable battery having a membrane that is connected with a first electrode and a second terminal that is connected with a second electrode. The method includes: blocking a current by melting a fuse connector that is formed between a first portion that is connected with the second electrode and a second portion that is connected with a bus bar in the second terminal due to contact between a membrane, which is deformed when an internal pressure is increased, thereby causing a short circuit, and the fuse connector, while the membrane contacts the second terminal due to deformation of the membrane.

Advantageous Effects

According to the exemplary embodiment of the present invention, the membrane and the terminal contact each other, thereby causing a short-circuit, and the terminal can be separated into two portion due to the short-circuit.

MODE FOR INVENTION

Figure 1:
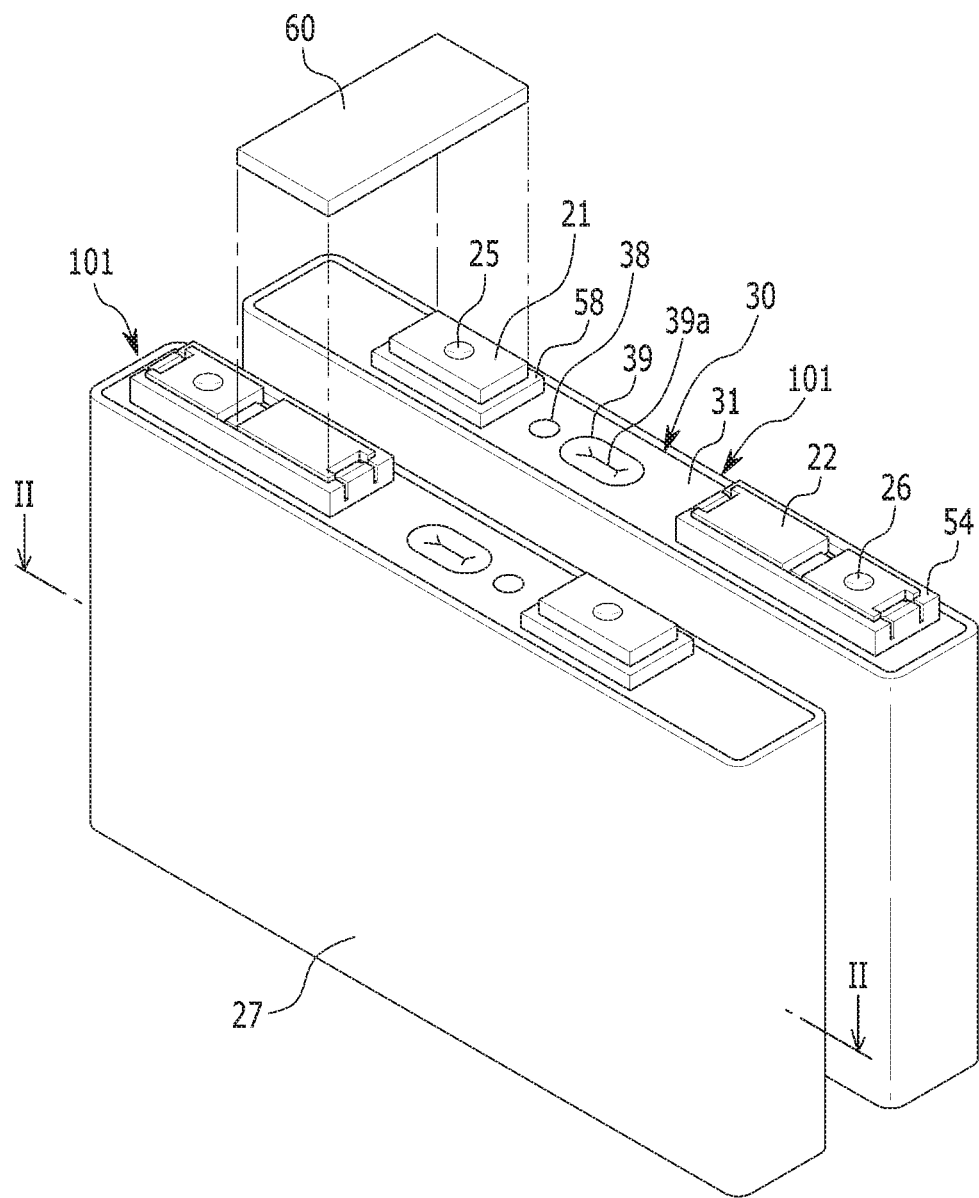
FIG. 1 is a perspective view of rechargeable batteries according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the scope of the present invention. Like reference numerals in the specification and drawings designate like elements throughout the specification.

Figure 2:
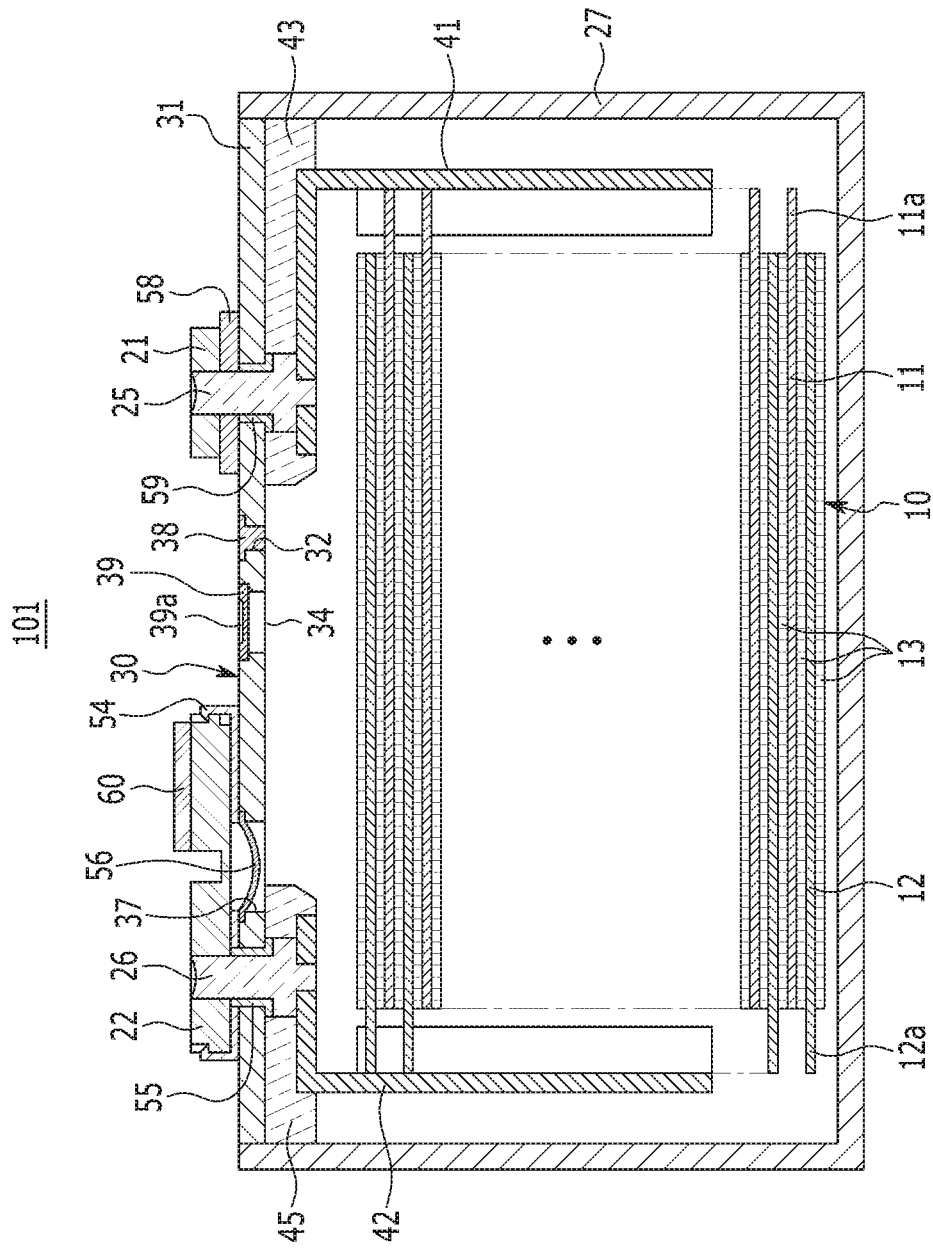
FIG. 2 is a cross-sectional view of FIG. 1, taken along the line II-II.

FIG. 1 is a perspective view of rechargeable batteries according to an exemplary embodiment of the present invention, and FIG. 2 is a cross-sectional view of FIG. 1, taken along the line II-II.

Referring to FIG. 1 and FIG. 2, a rechargeable battery 101 according to a first exemplary embodiment of the present invention includes an electrode assembly 10 and a case 27 where the electrode assembly 10 is embedded. The electrode assembly 10 is formed by spirally winding a positive electrode (first electrode) 11 and a negative electrode (second electrode) 12, while disposing a separator 13 therebetween.

The rechargeable battery 101 according to the present exemplary embodiment is a lithium ion secondary battery, and is exemplarily formed in the shape of a prism. However, the present invention is not limited thereto, and the present invention can be applied to various batteries such as a lithium polymer battery or a cylindrical battery.

The positive electrode 11 and the negative electrode 12 include coated regions and uncoated regions 11a and 12a. The coated regions are regions where an active material is applied to a current collector that is formed of a thin film metal foil, and the uncoated regions 11a and 12a are not applied with the active material. A positive uncoated region 11a is formed at one side end of the positive electrode 11 along a length direction of the positive electrode 11, and a negative uncoated region 12a is formed at the other side end of the negative electrode 12 along a length direction of the negative electrode 12. In addition, the positive electrode 11 and the negative electrode 12 are spirally wound, while disposing the separator 13, which is an insulator, therebetween.

However, the present invention is not limited thereto, and the electrode assembly 10 may have a structure in which a positive electrode and a negative electrode, each formed of a plurality of sheets, are stacked, while interposing a separator therebetween.

The case 27 is substantially formed in the shape of a cuboid, and an opening is formed at an upper end thereof. The case 27 may be made of a metal such as aluminum, stainless steel, and the like.

A cap assembly 30 includes a cap plate 31 that covers the opening of the case 27, a first terminal 21 that protrudes to the outside the cap plate 31 and is electrically connected with the positive electrode 11, and a second terminal 22 that protrudes to the outside the cap plate 31 and is electrically connected with the negative electrode 12.

The cap plate 31 is formed in the shape of a plate extended in one direction, and is combined to the opening of the case 27. A sealing cap 38 disposed in an electrolyte injection opening 32 and a vent plate 39 provided in a vent hole 34 are formed in the cap plate 31. The vent plate 39 is provided with a notch 39a that is opened at a predetermined pressure. The first terminal 21 and the second terminal 22 protruded over the cap plate 31. In addition, a short-circuit hole 37 where a membrane 56 is inserted is formed in the cap plate 31.

Since the cap assembly 30 includes the membrane 56 that disconnects the positive electrode 11 and the negative electrode 12, the membrane 56 is electrically connected with the cap plate 31, and is connected with the second terminal 22 by being deformed when an internal pressure of the rechargeable battery 101 is increased. The membrane 56 is disposed between an upper insulation member 54 and the cap plate 31 in the short-circuit hole 37.

Figure 3:
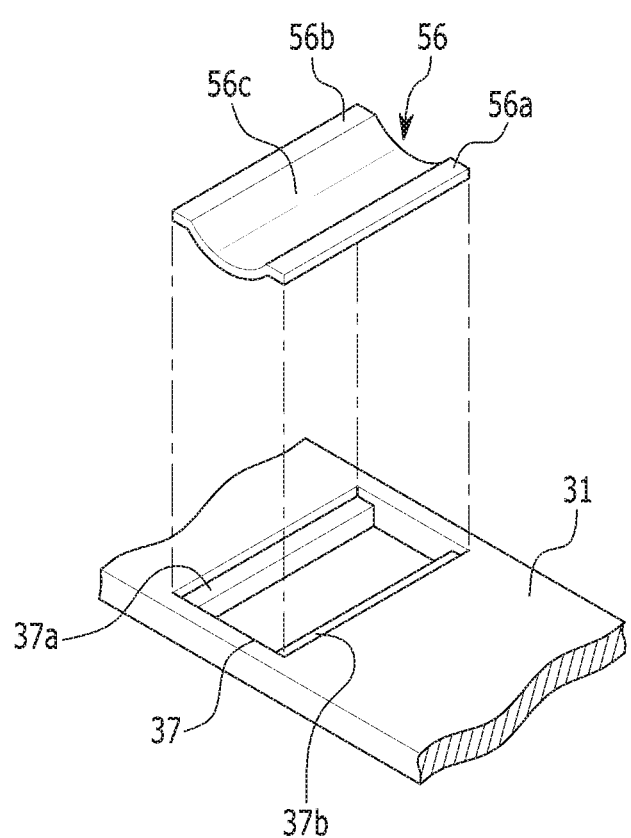
FIG. 3 is an exploded perspective view of a cap plate and a membrane according to the first exemplary embodiment of the present invention.

As shown in FIG. 3, the short-circuit hole 37 is formed in the shape of a hole having a quadrangular cross-section, and receiving grooves 37a and 37b that support the membrane 56 are respectively formed at opposite sides of the short-circuit hole 37.

The membrane 56 includes two supports 56a and 56b that are formed flat, and a deformable portion 56c that is disposed between the supports 56a and 56b and is curved. The supports 56a and 56b are respectively formed in the shape of a flat plane that extend in a straight line direction, and are respectively connected at opposite ends of the deformable portion 56c. The deformable portion 56c may be formed in the shape of a cylinder having a downwardly convex arc-shaped longitudinal section. Thus, when the deformable portion 56c is deformed, the membrane 56 may linearly contact the second terminal 22 rather than having point contact with the second terminal 22.

When a gas is generated in the rechargeable battery 101, the internal pressure of the rechargeable battery 101 is increased. When the internal pressure of the rechargeable battery 101 becomes higher than a predetermined pressure, the deformable portion 56c is deformed to be convex upward such that the membrane 56 contacts the second terminal 22, thereby causing a short circuit.

The first terminal 21 is electrically connected with the positive electrode 11 through a first current collecting member 41, and the second terminal 22 is electrically connected with the negative electrode 12 through a second current collecting member 42. However, the present invention is not limited thereto, and the first terminal 21 may be electrically connected with the negative electrode 12 and the second terminal 22 may be electrically connected with the positive electrode 11.

The first terminal 21 is formed in the shape of a rectangular plate. The first terminal 21 is electrically connected with the positive electrode 11 through a connection terminal 25 that is bonded to the first current collecting member 41. The connection terminal 25 connected to the first terminal 21 and a connection terminal 26 connected to the second terminal 22 are formed in the same structure. The connection terminal 25 is formed in the shape of a column, and a flange is formed at a lower portion thereof. In addition, an upper end of the connection terminal 25 may be fixed by caulking or welding to the first terminal 21.

A sealing gasket 59 is provided by being inserted into a hole through which the terminal penetrates, between the first terminal 21 and the cap plate 31 for sealing, and a lower insulation member 43 is provided below the cap plate 31 to support the first current collecting member 41.

A connection member 58 that electrically connects the first terminal 21 and the cap plate 31 is provided below the first terminal 21. Accordingly, the cap plate 31 and the case 27 are positively charged.

Figure 4:
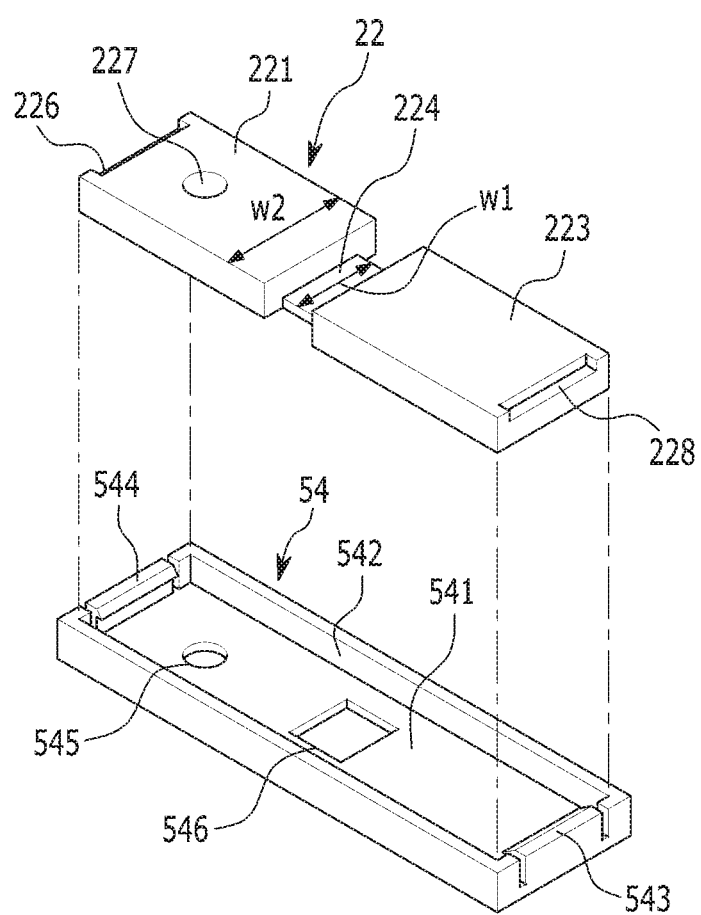
FIG. 4 is an exploded perspective view of a second terminal and an upper insulation member according to the first exemplary embodiment of the present invention.

FIG. 4 is an exploded perspective view of the second terminal and the upper insulation member according to the first exemplary embodiment of the present invention.

Referring to FIG. 2 and FIG. 4, the second terminal 22 is electrically connected with the negative electrode 12 through the connection terminal 26 that is bonded to the second current collecting member 42. The connection terminal 26 penetrates the cap plate 31 and the second terminal 22 and thus an upper end of the connection terminal 26 is fixed to the second terminal 22.

A sealing gasket 55 is provided by being inserted into a hole through which the terminal penetrates, between the second terminal 22 and the cap plate 31 for sealing, and a lower insulation member 45 is provided below the cap plate 31 for insulation of the second terminal 22 and the second current collecting member 42 in the cap plate 31.

The upper insulation member 54 that electrically insulates the second terminal 22 and the cap plate 31 is provided between the second terminal 22 and the cap plate 31. The upper insulation member 54 includes a base plate 541 that is formed in the shape of a quadrangular plate, a side wall 542 that protrudes along a side end of the base plate 541, and hooking portions 543 and 544 that protrude in a direction of the inside from opposite ends of the base plate 541 in a length direction thereof.

The hooking portions 543 and 544 are coupled to support grooves 226 and 228 that are provided at opposite ends in the length direction of the second terminal 22 to support the second terminal 22. The base plate 541 includes a terminal hole 545 through which the connection terminal 26 penetrates and a connection hole 546 that is provided above the membrane 56. The connection hole 546 is disposed between the membrane 56 and a fuse connector 224 and has a quadrangular-shaped cross-section.

The second terminal 22 extends in one direction to cover the short-circuit hole 37. The second terminal 22 includes a first portion 221, a second portion 223, and the fuse connector 224 that connects the first portion 221 and the second portion 223 and is smaller than the first portion 221 in thickness.

The first portion 221 is formed in the shape of a cuboid, and includes a terminal hole 227 to which the connection terminal 26 is inserted and the support groove 226 that is formed at a side end of the first portion 221. The second portion 223 is disposed at a distance from the first portion 221, and is formed in the shape of a cuboid. In addition, the second portion 223 includes the support groove 228 that is formed at a side end thereof.

The first portion 221 is electrically connected with the negative electrode 12 through the connection terminal 26, and the second portion 223 is connected with a bus bar 60 that electrically connects neighboring rechargeable batteries 101.

The fuse connector 224 may be formed in the shape of a flat panel, and has a thickness that is smaller than that of the first portion 221 and that of the second portion 231 so as to be melted when a short-circuit current flows. A thickness T1 of the fuse connector 224 may be 0.05 times to 0.06 times a thickness T2 of the first portion 221. In addition, the second portion 223 may have a thickness that is the same as the thickness of the first portion 221. Further, the fuse connector 224 may have a width that is smaller than that of the first portion 221, and a width W1 of the fuse connector 224 may be 0.02 times to 0.9 times a width W2 of the first portion 221.

Figure 5:
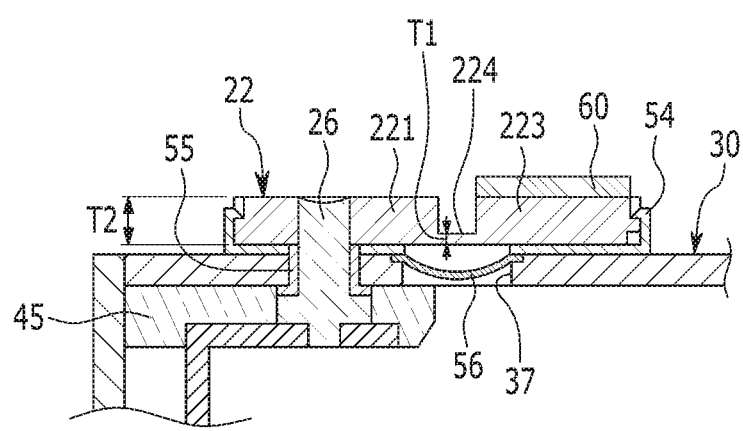
FIG. 5 is a cross-sectional view of a part of the rechargeable battery according to the first exemplary embodiment of the present invention.
Figure 6:
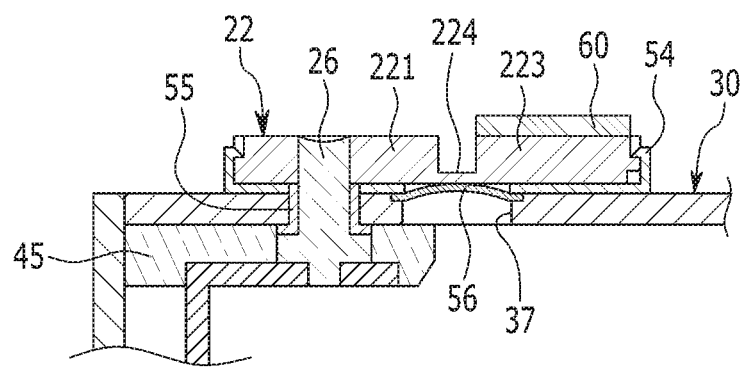
FIG. 6 is a cross-sectional view of a state in which the membrane and the second terminal in the rechargeable battery according to the first exemplary embodiment are short-circuited.

FIG. 5 is a cross-sectional view of a part of the rechargeable battery according to the first exemplary embodiment of the present invention, and FIG. 6 is a cross-sectional view of a state in which the membrane and the second terminal of the rechargeable battery of the first exemplary embodiment are short-circuited.

Referring to FIG. 5 and FIG. 6, the fuse connector 224 is disposed above the membrane 56, and the fuse connector 224 may overlap the membrane 56 while having a space therebetween. Accordingly, when the membrane 56 is deformed, the membrane 56 may contact the fuse connector 224, thereby causing a short circuit.

When the fuse connector 224 and the membrane 56 contact each other, a short-circuit current flows and thus heat is generated from a contact portion. Heat generated between the fuse connector 224 and the membrane 56 melts the fuse connector 224 and the membrane 56 and the first portion 221 and the second portion 223 are electrically disconnected. Since the short-circuit current flows for a very short period of time, the fuse connector 224 may be melted while controlling the current to be sufficiently discharged by adjusting a thickness of the fuse connector 224.

Accordingly, the rechargeable battery 101 where an abnormality occurs due to electrical disconnection between the second terminal 22 and the bus bar 60 does not perform charging and discharging, and thus safety can be improved.

A method for blocking a current in the rechargeable battery according to the first exemplary embodiment will now be described with reference to FIG. 3 and FIG. 4.

The membrane 56 that is deformed according to an internal pressure increase contacts the fuse connector 224 provided between the first portion 221 that is connected with the negative electrode 12 and the second portion 223 that is connected with the bus bar 60 in the second terminal 22 while contacting the second terminal 22 due to deformation, and thus the fuse connector 224 is melted, thereby blocking the current.

The current blocking method according to the first exemplary embodiment includes a step for connecting the membrane 56 and the fuse connector 224 due to deformation of the membrane 56, and a step for melting the fuse connector 224 due to discharging of the short-circuit current.

When the current is blocked due to contact between the fuse connector 224 and the membrane 56, the electrical connection between the bus bar 60 and the negative electrode 12 can be disconnected while discharging the short-circuit current within a short period of time.

Figure 7:
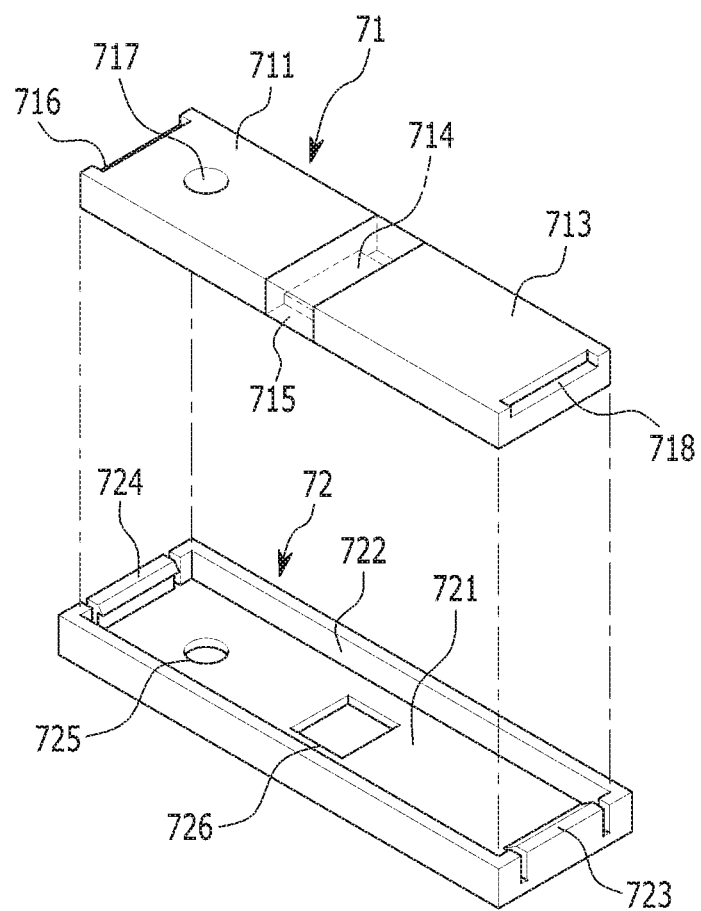
FIG. 7 is an exploded perspective view of a second terminal and an upper insulation member according to a second exemplary embodiment of the present invention.

Hereinafter, referring to FIG. 7, a rechargeable battery according to a second exemplary embodiment of the present invention will be described. FIG. 7 is an exploded perspective view of a second terminal and an upper insulation member according to the second exemplary embodiment of the present invention.

Referring to FIG. 7, a rechargeable battery according to the second exemplary embodiment is the same as the rechargeable battery of the first exemplary embodiment in structure, and therefore a description of the same structure will be omitted.

A second terminal 71 is disposed on a cap plate through an upper insulation member 72. The upper insulation member 72 includes a base plate 721 formed in the shape of a quadrangular-shape plate, a side wall 722 protruded along sides of the base plate 721, and hooking portions 723 and 724 protruded in a direction toward the inside at opposite ends in a length direction of the base plate 721.

The hooking portions 723 and 724 are coupled to support grooves 716 and 718 that are formed at opposite ends in a length direction of the second terminal 71 to support the second terminal 71. The base plate 721 includes a terminal hole 725 through which a connection terminal penetrates and a connection hole 726 that is formed above a membrane. The connection hole 726 is disposed between the membrane and a fuse connector 714, and has a quadrangular-shaped cross-section.

The second terminal 71 extends in one direction to cover a short-circuit hole. The second terminal 71 includes a first portion 711, a second portion 713, and the fuse connector 714 that connects the first portion 711 and the second portion 713 and has a thickness that is smaller than the first portion 711.

The first portion 711 is formed in the shape of a cuboid, and includes a terminal hole 717 into which the connection terminal 26 is inserted and the support groove 716 provided at one side end of the first portion 711. The second portion 713 is disposed at a distance from the first portion 711, and is formed in the shape of a cuboid. In addition, the second portion 713 includes the support groove 718 that is formed at one side end thereof. The first portion 711 is electrically connected with a second electrode through a connection terminal, and the second portion 713 is connected with a bus bar.

The fuse connector 714 may be formed in the shape of a flat panel, and has a thickness that is smaller than that of the first portion 711 and that of the second portion 713 so as to be melted when a short-circuit current flows. A first thickness T1 of the fuse connector 714 may be 0.05 times to 0.4 times a thickness T2 of the first portion 711. In addition, the fuse connector 714 may have a width that is smaller than the first portion 711.

The second terminal 71 further includes a support member 715 that surrounds the fuse connector 714, and the support member 715 has an electrical insulation property. The support member 715 may be formed by insert-injection molding. The support member 715 surrounds top and side surfaces of the fuse connector 714 and exposes the bottom surface. Since the bottom surface of the fuse connector 714 which faces the membrane is exposed, the membrane and the fuse connector 714 may contact each other. When the fuse connector 714 and the membrane contact each other, an arc may occur. The arc may spread to the periphery, and the support member 715 prevents generation and spread of the arc.

Figure 8:
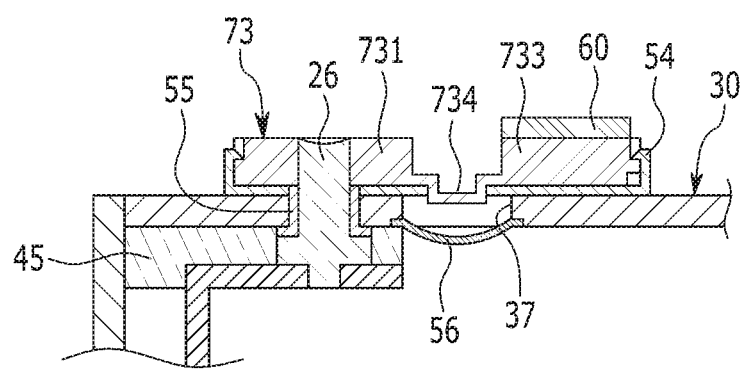
FIG. 8 is a cross-sectional view of a part of a rechargeable battery according to a third exemplary embodiment of the present invention.

Hereinafter, a rechargeable battery according to a third exemplary embodiment of the present invention will be described with reference to FIG. 8 and FIG. 9. FIG. 8 is a cross-sectional view of a part of a rechargeable battery according to a third exemplary embodiment of the present invention, and FIG. 9 is a perspective view of a second terminal, viewed from the bottom, according to the third exemplary embodiment of the present invention.

Figure 9:
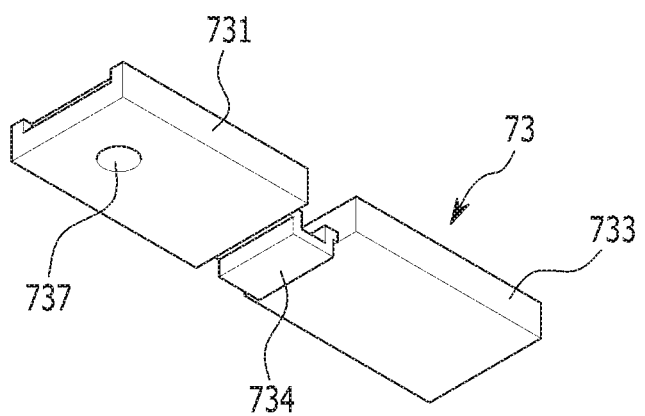
FIG. 9 is a perspective view of a second terminal, viewed from the bottom, according to the third exemplary embodiment of the prevention.

Referring to FIG. 8 and FIG. 9, a rechargeable battery according to the third exemplary embodiment is the same as the rechargeable battery of the first exemplary embodiment in structure, excluding a second terminal 73, and therefore a description of the same structure will be omitted.

The second terminal 73 extends in one direction to cover a short-circuit hole. The second terminal 73 includes a first portion 731, a second portion 733, and a fuse connector 734 having a thickness that is smaller than the first portion 731.

The first portion 731 and the second portion 733 are respectively formed in the shape of a cuboid, and they are disposed apart from each other. The first portion 731 is electrically connected with a connection terminal 26, and the second portion 733 is connected with a bus bar 60.

A lower end of the fuse connector 734 may protrude lower than a lower end of the first portion 731. The fuse connector 734 is provided with a curved portion and a portion connected with the first portion 731 and the second portion 733 and then protruded downward. The fuse connector 734 may protruded downward and then may be inserted into a short-circuit hole 37. Meanwhile, a membrane 56 is fixed to a bottom of a cap plate and faces the fuse connector 734, and may contact the fuse connector 734 when being deformed, thereby causing a short circuit.

Figure 10:
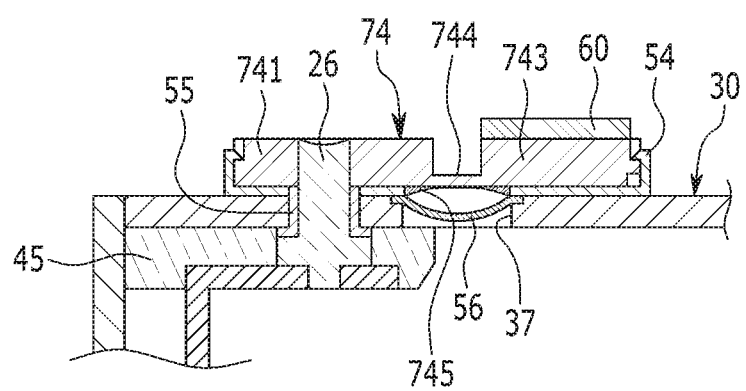
FIG. 10 is a cross-sectional view of a rechargeable battery according to a fourth exemplary embodiment of the present invention.

Hereinafter, a rechargeable battery according to a fourth exemplary embodiment of the present invention will be described with reference to FIG. 10. FIG. 10 is a cross-sectional view of a rechargeable battery according to a fourth exemplary embodiment of the present invention.

Referring to FIG. 10, the rechargeable battery according to the fourth exemplary embodiment is the same as the rechargeable battery according to the first exemplary embodiment in structure, excluding a second terminal 74, and therefore a description of the same structure will be omitted.

The second terminal 74 extends in one direction to cover a short-circuit hole. The second terminal 74 includes a first portion 741, a second portion 743, and a fuse connector 744 that connects the first portion 741 and the second portion 743 and has a thickness that is smaller than the first portion 741.

The first portion 741 and the second portion 743 are formed in the shape of a cuboid, and they are disposed apart from each other. The first portion 741 is electrically connected with a connection terminal 26, and the second portion 743 is connected with a bus bar 60.

A guide protrusion 745 is provided below the fuse connector 744, and the guide protrusion 745 may be provided as an insulator such as a polymer and the like. The guide protrusion 745 has an internal side having an arc-shaped longitudinal section, and guides a membrane 56 to stably contact the fuse connector 744 when the membrane 56 is being deformed. Accordingly, a current can be discharged due to the contact between the membrane 56 and the fuse connector 744, and the fuse connector 744 is melted so that safety of the rechargeable battery can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

DESCRIPTION OF SYMBOLS

| | |
|---|---|
| 101: rechargeable battery | 10: electrode assembly |
| 11: positive electrode | 11a: positive uncoated region |
| 12: negative electrode | 12a: negative uncoated region |
| 13: separator | 21: first terminal |
| 22, 71, 73, 74: second terminal | |
| 221, 711, 731, 741: first portion | |
| 223, 713, 733, 743: second portion | |
| 224, 714, 734, 744: fuse connector | |
| 226, 228, 716, 718: support groove | |
| 227, 717: terminal hole | 25, 26: connection terminal |
| 27: case | 30: cap assembly |
| 31: cap plate | 32: electrolyte injection opening |
| 34: vent hole | 37: short-circuit hole |
| 37a, 37b: receiving groove | 38: sealing cap |
| 39: vent plate | 39a: notch |
| 41: first current collecting member | |
| 42: second current collecting member | |
| 43, 45: lower insulation member | 54, 72: upper insulation member |
| 541, 721: base plate | 542, 722: side wall |
| 543, 544, 723, 724: hooking portion | 545, 725: terminal hole |
| 546, 726: connection hole | 72: upper insulation member |
| 721: base plate | 55: sealing gasket |
| 56: membrane | 56a, 56b: support portion |
| 56c: deformable portion | 58: connection member |
| 59: sealing gasket | 60: bus bar |
| 745: guide protrusion | |

The invention claimed is:

1. A rechargeable battery comprising:
an electrode assembly that includes a first electrode and a second electrode;
a case where the electrode assembly is received;
a first terminal that is electrically connected with the first electrode and a second terminal that is electrically connected with the second electrode;
a cap plate that is coupled with the case, and where a short-circuit hole is formed; and
a membrane that is fixed to the cap plate and electrically separates or disconnects the first electrode and the second electrode,
wherein the second terminal includes a fuse connector, a first portion, and a second portion, and the first portion and the second portion are connected by the fuse connector, and
the fuse connector is disposed apart from the membrane and disposed opposing the membrane.

2. The rechargeable battery of claim 1, further comprising a connection terminal that is inserted into the first portion and connects the second electrode and the second terminal, wherein the second portion is connected with a bus bar that electrically connects neighboring rechargeable batteries.

3. The rechargeable battery of claim 1, wherein a thickness of the fuse connector is 0.05 times to 0.6 times a thickness of the first portion.

4. The rechargeable battery of claim 1, wherein the fuse connector has a width that is smaller than the first portion.

5. The rechargeable battery of claim 1, wherein the membrane contacts the fuse connector and causes a short circuit when being deformed.

6. The rechargeable battery of claim 1, wherein the second terminal further comprises a support member that surrounds the fuse connector and has an electrical insulation property, and the support member is inserted between the first portion and the second portion.

7. The rechargeable battery of claim 1, wherein the membrane includes two support portions that are formed flat and a deformable portion that is provided between the two support portions and being curved.

8. The rechargeable battery of claim 7, wherein the deformable portion is formed in the shape of a partial cylinder, and the support portions are extended in a straight line direction and are thus connected to opposite ends of the deformable portion.

9. The rechargeable battery of claim 1, wherein the fuse connector is protruded downward and inserted into the short-circuit hole.

10. The rechargeable battery of claim 1, wherein the fuse connector comprises a bottom side, a first side that protrudes upward from the bottom side and is connected with the first portion, and a second side that protrudes upward from the bottom side and is connected with the second portion.

11. The rechargeable battery of claim 1, wherein the second terminal further comprises a guide protrusion that protrudes toward the membrane and guides deformation of the membrane.

12. The rechargeable battery of claim 1, further comprising an upper insulation member that is disposed between the second terminal and the cap plate,
wherein the upper insulation member further includes a connection hole that is disposed between the membrane and the fuse connector, and the connection hole has a quadrangular-shaped cross-section.

13. The rechargeable battery of claim 1, wherein the fuse connector has a thickness that is smaller than that of the first portion and that of the second portion.

14. A method for blocking a current of a rechargeable battery having a membrane that is connected with a first electrode and a second terminal that is connected with a second electrode, the method comprising:
blocking a current by melting a fuse connector that is formed between a first portion that is connected with the second electrode and a second portion that is connected with a bus bar in the second terminal due to contact between the fuse connector and the membrane, which is deformed when an internal pressure is increased, thereby causing a short circuit while the membrane contacts the second terminal due to deformation of the membrane.

* * * * *